United States Patent
Liu et al.

(10) Patent No.: US 10,048,739 B2
(45) Date of Patent: Aug. 14, 2018

(54) MANAGING POWER CONSUMPTION OF A GATED CLOCK MESH

(71) Applicant: International Business Machines Corporation, Armonk, NY (US)

(72) Inventors: Yang Liu, Shanghai (CN); Yue Xu, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 119 days.

(21) Appl. No.: 15/292,159

(22) Filed: Oct. 13, 2016

(65) Prior Publication Data

US 2018/0107264 A1   Apr. 19, 2018

(51) Int. Cl.
G06F 1/32 (2006.01)
G06F 17/50 (2006.01)
G06F 1/12 (2006.01)

(52) U.S. Cl.
CPC ............. *G06F 1/3237* (2013.01); *G06F 1/12* (2013.01); *G06F 1/3234* (2013.01); *G06F 17/5036* (2013.01); *G06F 17/5068* (2013.01); *G06F 17/5077* (2013.01)

(58) Field of Classification Search
CPC .. G06F 1/3237; G06F 1/3234; G06F 17/5036; G06F 17/5068; G06F 17/5077
See application file for complete search history.

(56) References Cited

U.S. PATENT DOCUMENTS

| 7,587,686 | B1* | 9/2009 | Schleicher, II | G06F 17/505 716/100 |
| 8,704,577 | B2 | 4/2014 | Taskin et al. | |
| 2013/0194016 | A1* | 8/2013 | Wimer | H03K 19/0016 327/199 |
| 2015/0168992 | A1* | 6/2015 | Choi | G06F 1/12 327/108 |
| 2016/0328507 | A1* | 11/2016 | Millar | G06F 17/5045 |

OTHER PUBLICATIONS

Lu et al., "Clock mesh synthesis with gated local trees and activity driven register clustering", pp. 691-697, Nov. 5, 2012, ACM.
Lu et al., "Timing slack aware incremental register placement with non-uniform grid generation for clock mesh synthesis", pp. 131-138, Mar. 27, 2011, ACM.
Rajaram et al., "MeshWorks: An Efficient Framework for Planning, Synthesis and Optimization of Clock Mesh Networks", pp. 250-257, Jan. 27, 2008, IEEE.

* cited by examiner

*Primary Examiner* — Stefan Stoynov
(74) *Attorney, Agent, or Firm* — Nicholas D. Bowman

(57) ABSTRACT

Power consumption of an integrated circuit (IC) clock mesh can be managed by a method of clock mesh design. Clock mesh data, including a location of a set of circuit elements and gating information of the set of circuit elements of the clock mesh, can be retrieved. A portion of the clock mesh, known as a local clock mesh, can be identified by analyzing the clock mesh data. The local clock mesh can include a subset of circuit elements having substantially similar clock gating characteristics, and which satisfy a placement density threshold. Mesh clock gating (MCG) cells can be added to wires surrounding the perimeter of the local mesh. MCG cells can be configured to enable and disable clock loads and clock mesh wires within the local clock mesh.

20 Claims, 5 Drawing Sheets

MANAGING POWER CONSUMPTION OF A GATED CLOCK MESH

BACKGROUND

The present disclosure relates to synchronous/clocked digital circuits, and more specifically, to the management of power consumption of a gated clock mesh within an integrated circuit (IC).

Synchronous digital circuits are circuits in which the data states of memory elements are synchronously updated in response to a clock signal received by the memory elements. Circuit delay can be introduced throughout a clock distribution circuit in order to ensure that all memory elements are clocked and subsequently capture their respective data within a specified time interval. As IC circuit performance becomes faster, and the tolerances for the arrival time of clock signals at memory elements become tighter, clock distribution circuit delays can be increasingly affected by IC manufacturing process variations. Such variations can cause functionally similar and physically proximate circuit elements to exhibit significantly different propagation delays. To manage and mitigate these delay variations, signal timing margins may need to be increased significantly in order to protect circuits against signal timing violations. Clock distribution schemes that include clock meshes can be used to provide relatively uniform, low-skew clock distribution to digital memory and logic elements within an IC. Clock mesh structures can also be used to provide tighter on-chip delay tolerances relative to those provided by conventional clock tree designs.

SUMMARY

Embodiments may be directed towards a method, implemented on at least one processor circuit, of designing a clock mesh of an integrated circuit (IC). The method can include retrieving, from at least one IC design file by using a clock gating manager program running on at least one processor circuit, data. The data can include locations of circuit elements electrically connected to the clock mesh, and can also include clock gating characteristics of the circuit elements. The method can also include identifying, by analyzing the data with the clock gating manager program, a local mesh that is a portion of the clock mesh. The local mesh can be electrically connected to a first subset of the circuit elements, the first subset of circuit elements satisfying a first density threshold. The method can also include electrically interconnecting, with the clock gating manager program and within the at least one IC design file, outputs of a set of mesh clock gating (MCG) cells to local mesh wires located at the perimeter of the local mesh. The MCG cells can be configured to enable and disable a clock signal driven by the MCG cells, through the local mesh wires, to circuit elements, of the first subset of circuit elements, having substantially similar clock gating characteristics.

Embodiments may also be directed towards an IC. The IC can include a clock mesh, configured to distribute a clock signal to a set of circuit elements. The IC can also include a local mesh that is a portion of the clock mesh. The local mesh can be electrically coupled to clock inputs of a first subset of the set of circuit elements. The first subset can have substantially similar clock gating characteristics and can satisfy a first density threshold. The IC can also include a set of MCG cells surrounding the local mesh. The set of MCG cells can have inputs electrically coupled to the clock mesh and can have outputs electrically connected to the local mesh. The set of MCG cells can be to enable and disable distribution of the clock signal, through wires of the local mesh, to the first subset of circuit elements.

Embodiments may also be directed towards a design structure tangibly embodied in a non-transitory machine-readable storage medium used in a design process of a clock mesh of an IC. The design structure can have elements that, when processed in a semiconductor manufacturing facility, produce the IC. The IC can include the clock mesh, configured to distribute a clock signal to a set of circuit elements. The IC can also include a local mesh that is a portion of the clock mesh, the local mesh electrically coupled to clock inputs of a first subset of the set of circuit elements. The first subset can have substantially similar clock gating characteristics and satisfying a first density threshold. The IC can also include a set of MCG cells surrounding the local mesh. The set of MCG cells can have inputs electrically coupled to the clock mesh and can have outputs electrically connected to the local mesh. A set of MCG cells can be configured to enable and disable distribution of the clock signal, through wires of the local mesh, to the first subset of circuit elements.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
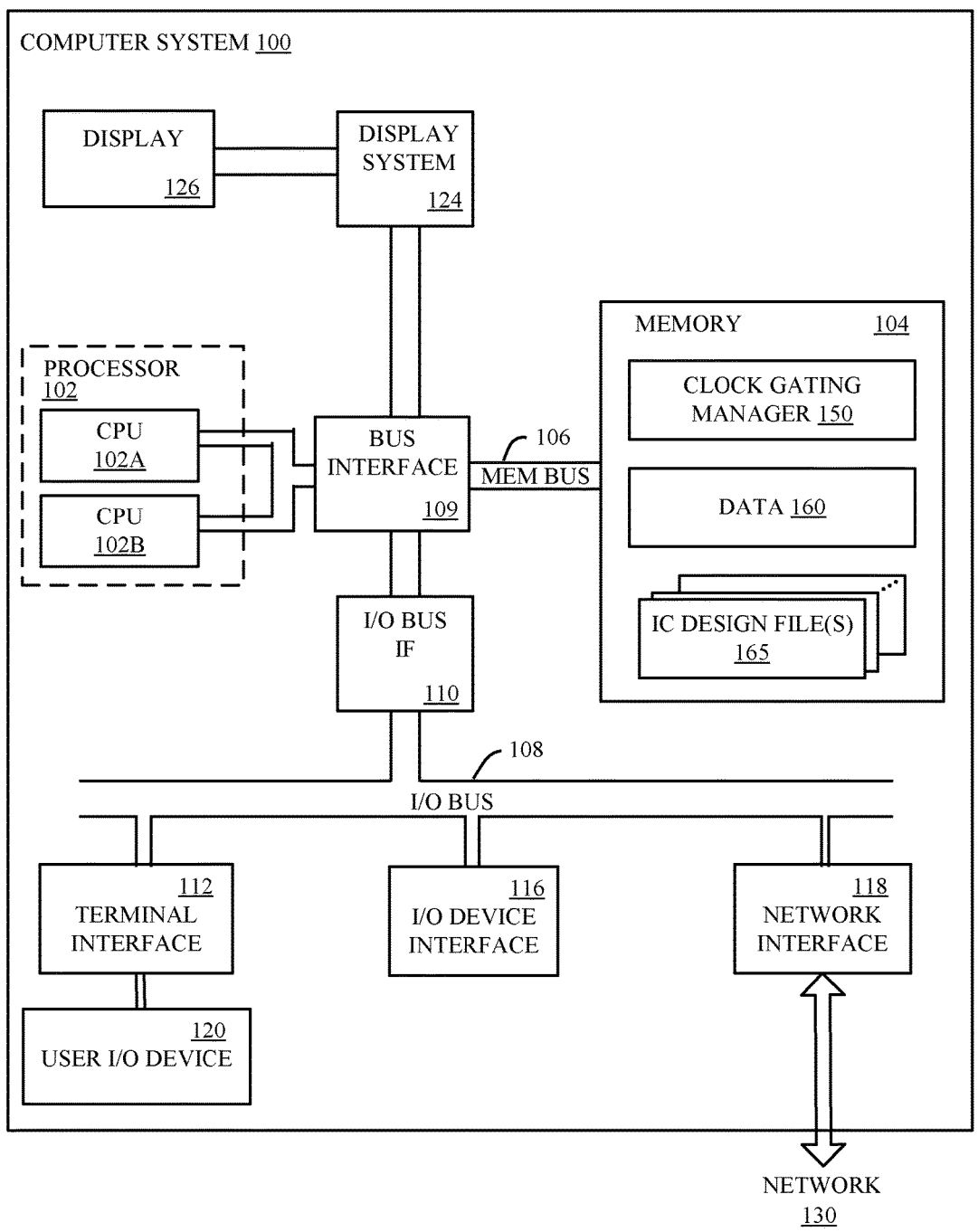
FIG. 1 depicts a computer system that includes a clock gating manager program, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing the power consumption of a clock mesh within a digital integrated circuit (IC). The IC clock mesh can be searched and analyzed to identify a cluster of neighboring components, such as data latches, that share similar clock timing characteristics. When such a cluster is identified, "mesh clock gating" (MCG) cells can be instantiated and electrically connected along the trunk, adjacent to the cluster of components, of the local clock mesh. The MCG cells can be activated or deactivated, depending upon whether or not a certain component cluster will be used in a particular clock cycle or period. This ability to activate and deactivate a portion of the clock mesh by activating or deactivating MCG cells can be useful in reducing power consumption resulting from the switching of clock mesh wires/segments and clock loads. Such clock loads, for example, the clock inputs of data latches, can be also referred to as clock "sinks", such as the clock inputs of data latches. While the present disclosure is not necessarily limited to such applications, various aspects of the disclosure may be appreciated through a discussion of various examples using this context. In the context of the present disclosure, the terms "clock load" and "load" may be used interchangeably to refer specifically to either a clock input of a circuit element, e.g., a latch, that is electrically connected to a clock mesh or generally, to the clocked circuit element itself.

Over time, ICs have become increasingly complex, including more components and electrical connections designed into, and fabricated within, smaller semiconductor areas. As this trend has continued, the management and limiting of complementary metal-oxide semiconductor (CMOS) IC power consumption has become a more critical design concern.

Dynamic power consumption in CMOS IC designs can be expressed by the following equation:

$$P = A \cdot C \cdot V^2 \cdot F$$

Where:
P=the total dynamic power of a CMOS circuit
A=the activity coefficient (the average fraction of the loads or sinks being switched at each clock cycle)
C=the total capacitance driven by all logic gates and/or drivers.
V=the operating/supply voltage. and.
F=the IC clock frequency.

The above equation describes cumulative CMOS IC power consumption resulting from voltage transients on both wires and clock loads, e.g., clock inputs of memory or data latch circuits on the IC. Though IC clock mesh designs can provide many performance benefits relative to clock tree synthesis (CTS) clock distribution schemes, IC clock mesh designs can also have greater power consumption than equivalent CTS schemes, due to the switching of wires/mesh segments and other circuit elements of an IC clock mesh. A solution to limit and/or manage the power consumption of an IC clock mesh circuit can include adding a set of local clock buffers (LCBs) to the clock mesh. LCBs generally contain logic elements/functions designed to gate, i.e., enable or disable, clock signals used to drive specific sets of logic/memory elements. While this type of design solution can manage consumption at specific clock loads, it does not, however, provide for management/reduction of power consumption resulting from switching of redundant interconnect wires/segments of the clock mesh.

Aspects of the present disclosure relate to instantiating and electrically interconnecting MCG cells to specific portion(s) of a clock mesh, in order to reduce the power consumption from wired and clock load switching within that local portion of the clock mesh. A local portion of a clock mesh can be identified by searching for and/or analyzing the circuit elements within the local mesh to identify those that share certain characteristics, including, but not limited to, substantially similar clock gating characteristics.

For ease of discussion, the term "clock buffer" is used herein, with reference to various clock buffers designed to redrive a received clock signal within an IC. In the context of driving a clock signal to various destinations within an IC, the terms "ungated clock buffer," "pure buffer" and "clock buffer" can be used interchangeably. The function of a clock buffer can be distinguished from the function of a MCG cell in that clock buffers lack any intrinsic ability to "gate" or enable/disable the clock signal redrive function within the clock buffer, whereas MCG cells have a clock gating function designed into the cell.

Referring to FIG. 1, a high-level block diagram of a computer system 100 for managing the power consumption of an IC clock mesh is depicted. The components of the various embodiments disclosed herein apply equally to any appropriate computing system. The components of the example computer system 100 shown in FIG. 1 include a memory 104, a terminal interface 112, an I/O (Input/Output) device interface 116, and a network interface 118, all of which are communicatively coupled, directly or indirectly, for inter-component communication via a memory bus 106, an I/O bus 108, a bus interface unit 109, and an I/O bus interface unit 110.

The computer system 100 can include one or more general-purpose programmable central processing units (CPUs) 102A and 102B, generically referred to herein as the processor or processors 102. In some embodiments, the computer system 100 may contain multiple processors or processor units. In some embodiments, the computer system 100 may alternatively be a single CPU system. Each processor 102 can be configured to execute instructions which can be stored in the memory 104. Such instructions can be used, for example, to cause the clock gating manager 150 to perform the operations described in reference to method 300.

In some embodiments, the memory 104 may include a random-access semiconductor memory, storage device, or storage medium, either volatile or non-volatile, for storing or encoding data and programs. The memory 104 can store data 160, which can include electrical, physical and interconnect topology data corresponding to a clock mesh. The data 160 can include data retrieved and analyzed, by processors 102, as described herein, during clock optimization of circuits on an IC. In some embodiments, the data 160 can be stored in one or more computer systems 100 connected over the network 130. In some embodiments, the memory 104 represents the entire virtual memory of the computer system 100, and may also include the virtual memory of other systems coupled to the computer system 100 or connected via a network 130.

The memory 104 can store all or a portion of the various programs, modules and data structures for managing the power consumption of the IC clock mesh as discussed herein. For instance, the memory 104 can include the clock gating manager program 150. The clock gating manager program 150 can be used to analyze, design and modify a design of the clock mesh of an IC design. Such an IC design, including one or more designs of an IC clock mesh, can be stored in at least one IC design file 165. For example, the clock gating manager 150 may retrieve and analyze data, contained within at least one design file 165, representing a clock mesh of an IC design. Such design files can be located on various forms of computer-readable, non-transient media such as hard disk drives, solid-state drive, magnetic tape, or within a computer memory device. The design files can be configured to be written to and read from by various Electronic Design Automation (EDA) applications such as schematic capture, logic synthesis, layout, wiring, and other types of programs, consistent with those commercially available for IC design tasks.

Specific characteristics and features of IC and IC clock mesh designs stored within an IC design file can include, but are not limited to, locations, outlines and dimensions of physical features including circuit elements, circuit element terminals, interconnection wiring, clock mesh wires, and vertical interconnect structures. In some embodiments, an IC design file can also contain circuit element design and personalization characteristics including timing parameters and characteristics, e.g., propagation delay, setup and hold and rise/fall transition times, as well as data specifying connectivity between a circuit element and other circuit elements or logic functions within the IC.

The clock gating manager 150 can be used to analyze the IC clock mesh and identify a portion or cluster of circuit elements that are electrically connected to the clock mesh and that have substantially similar clock gating characteristics. The clock gating manager 150 can add MCGs to a perimeter of a local portion of the clock mesh that includes the identified circuits. The MCGs can act as clock drivers, clock frequency dividers, clock gates and/or test control integrators. In this way the MCGs can be used to simultaneously enable or disable a group of clocked circuit elements located within and electrically connected to the local portion of the IC clock mesh. This enabling and disabling capability can be useful in managing power consumption within that local portion of the clock mesh.

In the depicted embodiment, the computer system 100 includes a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 can communicate with multiple I/O interface units 112, 116, and 118, which can also be known as I/O processors (IOPs) or I/O adapters (IOAs), through the I/O bus 108. The display system 124 may include a display controller, a display memory, or both. The display controller may provide video, audio, or both types of data to a display device 126, such as a standalone display screen, computer monitor, television, or a tablet or handheld device display. The display system 124 may include a dedicated memory for buffering video data.

In some embodiments, the display device 126 may include one or more speakers for rendering audio. Alternatively, one or more speakers for rendering audio may be coupled with an I/O interface unit. In some embodiments, one or more of the functions provided by the display system 124 may be on board an integrated circuit that also includes the processor 102. In addition, one or more of the functions provided by the bus interface unit 109 may be included within an IC that also includes the processor 102.

The I/O interface units can support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may use such an I/O device 120 to initiate an action in response to an application stored within the memory 104 of the computer system 100. In some embodiments, the user input may be entered on another computer system of the network 130, and received by clock gating manager program 150 through the network interface 118.

The I/O device interface 116 provides an interface to any of a variety of other I/O devices or devices of other types, such as printers or fax machines. The network interface 118 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in some embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in some embodiments, some or all of the I/O devices are connected directly to one or more system I/O buses.

FIG. 1 depicts several example components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2A:
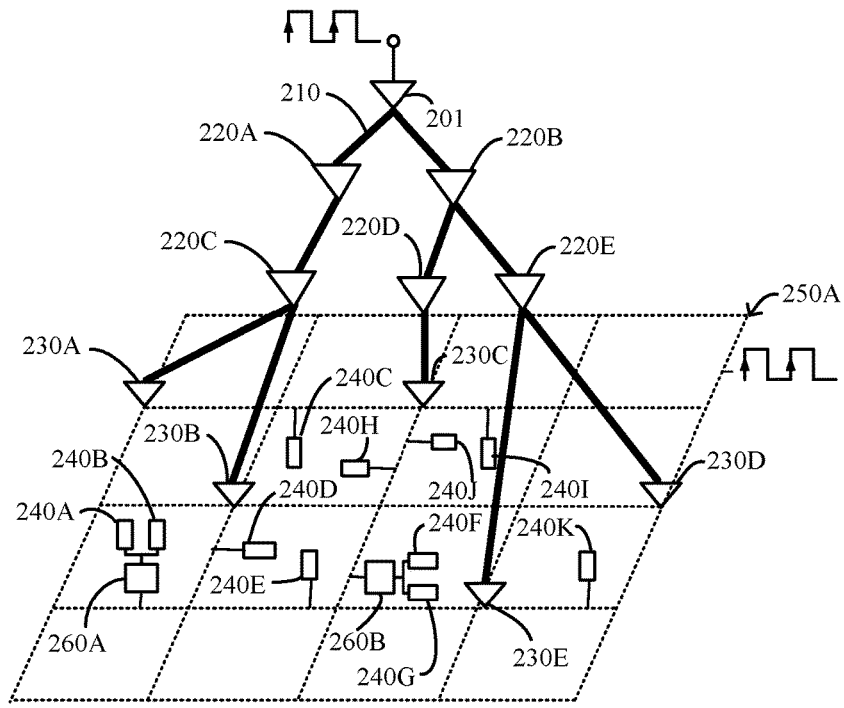
FIG. 2A depicts an example integrated circuit (IC) clock mesh structure, according to embodiments consistent with the figures.

FIG. 2A depicts an example IC clock mesh architecture. The example IC clock mesh architecture depicted by FIG. 2A is not intended as an exact depiction of the physical characteristics of an IC clock mesh architecture, but rather is intended as a hybrid representation, including a block diagram and physical diagram of the components and structure of an example clock mesh architecture. The example IC clock mesh architecture depicted in FIG. 2A can employ MCGs to manage power consumption, is driven by a clock source 201 and utilizes a clock tree 210, also referred to as a "global clock tree."

The clock tree 210 includes a set of relay buffers 220A-220E. The outputs of the set of relay buffers 220A-220E are electrically connected to the inputs of a set of sector buffers 230A-230E. In some embodiments both the set of relay buffers 220A-220E and the set of sector buffers 230A-230E can be ungated relay drivers or clock buffers that re-power the clock signals throughout the IC clock mesh architecture.

The outputs of the set of sector buffers 230A-230E are electrically connected to, and drive clock signals onto the clock mesh 250A, also referred to as the "mesh net 250A." The example IC clock mesh architecture depicted by FIG. 2A includes circuit elements 240A-240K. A clock "load" or "sink" can include an input of a clocked circuit element, for example, a circuit element used for data storage. Circuit elements can also be referred to as "macrocells", "macros", "logic macros" or "components". Clocked circuit elements can include latches, flip-flops or registers. Some of these loads 240A-240K may be electrically connected directly to the IC clock mesh 250A, for example, 240C, 240D, 240E, 240H, 240I, 240J, and 240K. Other loads can be connected indirectly to the clock mesh 250A through clock gating cells, e.g., 260A-260B. In some embodiments, clock gating cells 260A-260B can be LCBs. For example, loads 240A and 240B can be electrically connected to the clock mesh 250A through LCB 260A.

Electronic circuit elements can each have a certain amount of performance or delay variation resulting from IC manufacturing tolerances and variations. The clock mesh 250A can be useful in managing and limiting these performance variations, which can be manifested as arrival time differences of the clock signal, due to delay variations among the relay buffers 220A-220E and/or sector buffers 230A-230E. The limiting of skew between copies of the clock signal can result in substantially enhanced performance of clock mesh designs relative to CTS design approaches. Clock mesh designs can, however, consume significant amounts of power resulting from the switching of a large number of redundant wires within the clock mesh structure. In some applications, certain clock mesh solutions can consume between 20% and 30% more power than equivalent CTS clock design solutions.

Figure 2B:
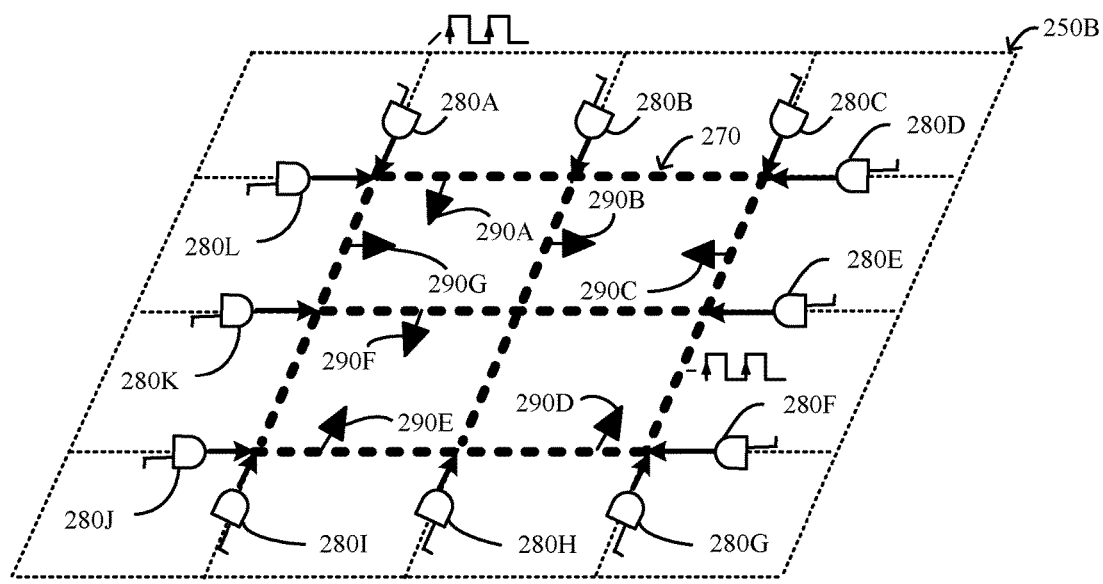
FIG. 2B depicts an IC clock mesh that includes mesh clock gating (MCG) cells, according to embodiments consistent with the figures.

FIG. 2B depicts a clock mesh architecture including a clock mesh 250B that includes MCGs 280A-280L. MCGs 280A-280L are mesh clock gating cells that are electrically connected to, and receive clock signals from, the clock mesh 250B. MCGs 280A-280L may be strategically placed to surround or encircle a portion of local mesh 270. The local mesh 270 is a portion of the clock mesh 250B that includes circuit elements, e.g., LCBs, loads and clock buffers, having substantially similar clock gating characteristics.

According to embodiments, "substantially similar clock gating characteristics" can, for example, include similarities in the timing of a clock gating signal used to enable and disable a clock signal, driven, for example, through an MCG or LCB, to a particular set of circuit/memory elements within a logical/functional block or macro within an IC. In certain applications, such a functional block, for example, a floating-point unit or graphics processing unit, may be used infrequently, and significant power reduction may result from disabling such a functional block when it is not active. In such an example, each of the clocked memory elements, e.g., latches or flip-flops, within the functional block may have substantially similar clock gating characteristics, and thus can receive clock signals from the same local mesh, e.g., 270, which may be selectively enabled or disabled as needed.

The MCGs 280A-280L can be enabled or disabled together so that segments of the local mesh 270 and the clocked element loads connected to it receive a clock signal only on an as-needed basis. By surrounding a subset of circuit elements, e.g., a set that has substantially similar clock gating characteristics, within an identified section of clock mesh 250B, e.g., local mesh 270, the MCGs 280 can reduce power consumption resulting from switching both wires and loads electrically connected to the local mesh 270.

In some embodiments, local clock buffers 290A-290G may be used within the local mesh 270 to connect the circuit elements having substantially similar clock gating characteristics to the local mesh 270. In certain embodiments, the local clock buffers 290A-290G can be re-customized LCBs, such as the LCBs 260A-260B of FIG. 2A.

A clock gating manager program, such as the clock gating manager 150 of FIG. 1, can initially search the clock mesh 250B and identifying circuit elements having substantially similar clock gating characteristics. For example, the clock gating manager may search the clock mesh 250A of FIG. 2A and identify loads 240C, 240D, 240E, 240F, 240G, 240H, 240I, and 240J as sharing an substantially similar clock gating characteristics, while loads 240A, 240B, and 240K have relatively dissimilar clock gating characteristics. In some embodiments, the clock gating manager may identify those circuit elements with substantially similar clock gating characteristics after a process of clock optimization, and before wire synthesis operations. The clock gating manager and identify the portion of the clock mesh 250A that includes loads 240C-290J as the local mesh 270.

MCG cells 280A-280L can then be added and electrically connected to the clock mesh 250 by the clock gating manager in order to completely encompass the identified circuit elements. As used herein, MCG cells surrounding circuit elements of a local mesh 270 include the MCG cells 280A-280L, located on each wire of the clock mesh immediately connected to the local mesh 270, so that no wire of the clock mesh connects to a circuit element of the local mesh without going through an MCG cell. While the local mesh 270 of FIG. 2B is depicted as a square shape, it can be understood and appreciated that the local mesh 270 can assume any appropriate shape within a realized circuit elements clock mesh.

In some embodiments clock buffers 290A-290G can be added to the local mesh 270, either replacing the LCBs 260A-260B originally located within the local mesh 270 or being placed between loads 240A-240K and the local mesh 270. For example, LCB 260B of FIG. 2A can be replaced with clock buffer 290D of FIG. 2B. Additionally, clock buffers 290A, 290B, 290C, 290E, 290F and 290G can be placed between loads 240C, 240H, 240J, 240I, 240E, 240D, and the local mesh 270, respectively.

In certain embodiments, loads 240A-240K that do not share substantially similar clock gating characteristics with other group(s) of circuit elements, may be initially located within the local mesh 270. For example, suppose that load 240K of clock mesh 250A was physically located to the left such that it was within an adjacent local mesh, as identified by a clock gating manager program. In this example, the clock gating manager may indicate that a subset of circuit elements, e.g., loads 240C-240J and LCB 260B within a proximity share substantially similar clock gating characteristics, while one load, e.g., 240K, within the proximity has relatively dissimilar clock gating characteristics. As such, the clock gating manager may determine to move load 240K with relatively dissimilar clock gating characteristics out of the local mesh 270.

Figure 3:
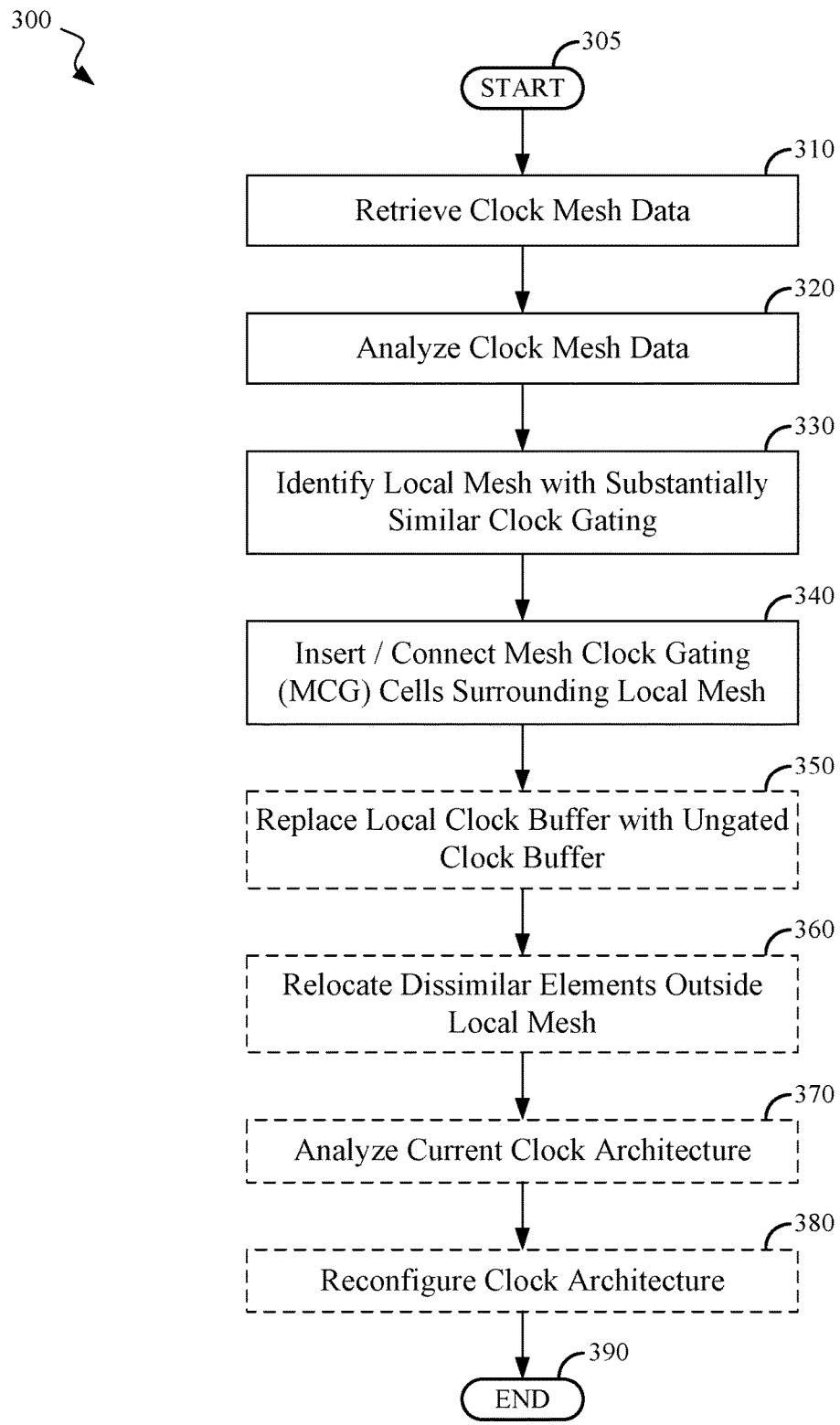
FIG. 3 is a flow diagram depicting a method of managing power consumption of an IC clock mesh, according to embodiments consistent with the figures.

FIG. 3 is a flow diagram illustrating a method 300 for managing the power consumption of an IC clock mesh. The structure of a clock mesh can be designed or modified by using a clock gating manager such as the clock gating manager program 150, FIG. 1. Such a clock gating manager program can be run on a processor such as processor 102, FIG. 1, and can be used to execute the operations included within method 300.

It can be understood that operations included within method 300 involve the manipulation and modification of IC and clock mesh design data contained within the in at least one IC design file 165. Such operations can include, but are not limited to, retrieving, analyzing and formatting clock mesh data, identifying sub-portion(s) of the clock mesh and placing/moving circuit element(s), e.g., MCG and LCB cells. In the course of performing such operations, the clock gating manager program, e.g., 150, FIG. 1, can both read data from and write data to the at least one IC design file 165.

Power consumption may be managed using MCGs as described herein. Operations depicted with dashed lines in FIG. 3 are optional operations within the method 300. The arrangement of blocks within the flow diagram of FIG. 3 is not to be construed as limiting the order in which the individual operations may be performed, as certain embodiments may perform the operations of FIG. 3 in various alternative orders. The process 300 moves from start 305 to operation 310.

At operation 310 clock mesh data is retrieved from at least one IC design file 165 and formatted. The clock mesh data can include data regarding the clock source, clock loads, buffers, drivers, clock mesh, gates, and/or loads of the clock architecture. In some embodiments, clock architecture data can include clock optimization results such as one or more clock optimization checkpoint netlists. Clock optimization can be an operation within a synchronous circuit design process, and the clock optimization stage may include the evaluation of synchronous circuit optimization techniques such as the cloning of LCBs and the grouping of registers and/or clock loads. The clock optimization stage can influence clock skew and routability, or the ability for signals to effectively be wired from a clock driver to a clock load. The clock optimization stage can also affect the final clock mesh topology. The clock optimization results can be formatted for efficient analysis, for example by converting such data into a computer-searchable format. For example, the clock optimization results can be formatted for efficient analysis of the mesh topology, LCB placement, and clock load grouping.

At operation 320 the clock mesh data is analyzed, which may include analyzing clock optimization results as described above. The clock optimization results can be analyzed by a clock gating manager program to identify a local mesh that includes multiple circuit elements, e.g., registers, latches, flip-flops and LCBs, having substantially similar clock gating characteristics. The clock optimization results can be analyzed by comparing the similarity and proximity of the circuit elements with the clock mesh. A clock gating manager may retrieve from at least one IC design file 165, a list of meshes or "grids", e.g., sub-portions of the clock mesh, having substantially similar clock gating characteristics.

For example, a clock gating manager may search for a mesh where there are two identical gates within two adjacent quadrants, e.g., two adjacent sections of mesh. Other searches with different numbers of gates within different numbers of quadrants are also possible. The results may also be queried for a certain number of circuit elements, e.g., at least three substantially similar gates, or a certain density, e.g., an average of 1.5 substantially similar gates per quadrant. The clock optimization results may be iteratively searched for local meshes which satisfy the particular search parameters.

In some embodiments, operation 320 can begin analyzing clock architecture data by identifying portions of clock mesh where LCBs, loads or gates have a placement density that satisfies a particular density threshold. A density threshold may be satisfied by determining that a ratio of a number of MCGs to a number of circuit elements of a possible local mesh is at least greater than a predetermined or user-defined ratio. This density ratio may include all circuit elements regardless of the similarity of clock gating characteristics. In such embodiments, a clock gating manager may only analyze whether or not a potential local mesh has a requisite number of substantially similar circuit elements only upon determining that a potential local mesh has a high density of circuit elements.

At operation 330 a local mesh with substantially similar clock gating characteristics is identified. The local mesh is a sub-portion of the clock mesh that includes each of the circuit elements having substantially similar clock gating characteristics. The local mesh can include a number of circuit elements that is above a particular threshold. In some embodiments, the circuit elements of the local mesh can have schematically identical clock gating. In some embodiments, the clock gating characteristics of the circuit elements of the local mesh may satisfy a "similarity threshold". The local mesh can be identified as a result of the circuit elements of the local mesh satisfying a density threshold, wherein there is at least some predetermined number of circuit elements per some predetermined number of clock mesh wires per quadrant.

In some embodiments a local mesh is only identified if all circuit elements within the local mesh have substantially similar clock gating characteristics. In some embodiments, a local mesh may be identified as long as there are multiple circuit elements within the local mesh that have substantially similar clock gating characteristics, even if one or more circuit elements of the local mesh have relatively dissimilar clock gating characteristics.

In certain embodiments, a local mesh is identified when the local mesh can be clustered with relative ease. For example, a portion of mesh that would require a relatively high number of MCGs to surround the substantially similar circuit elements may be discarded as a potential local mesh. A local mesh may be identified when it is determined that the local mesh can be created with a ratio of MCGs per circuit element that satisfies a particular threshold. For example, there may be a threshold of 3 to 1, indicating that where a local mesh is identified when the local mesh may be created with three or fewer MCG cells for each substantially similar circuit element that will be within the local mesh. In this example, if it would take ten MCG cells to create a local mesh for five substantially similar circuit elements then the local mesh is identified. On the other hand, if the ten MCG cells would only create a local mesh with 3 substantially similar circuit elements, than the possible local mesh is discarded.

At operation 340 MCG cells are placed along the boundary of the local mesh by the clock gating manager. The MCG cells are located so that the local mesh is surrounded or encircled with MCG cells. Within the context of this disclosure, surrounding the local mesh includes placing an MCG cell on each wire on the perimeter of the local mesh such that no wire connects to the local mesh without having an MCG cell. At operation 350 LCBs may be replaced with ungated clock buffers. In some embodiments, the original LCBs can be replaced with customized LCBs, or the original LCBs may be customized to function as ungated clock buffers.

In some cases, the local mesh can include one or more dissimilar circuit elements, i.e., circuit elements that have clock gating characteristics that do not correspond to the clock gating characteristics of the majority of circuit elements of the local mesh. In such instances, at operation 360 the dissimilar circuit elements can be relocated outside of the perimeter of the local mesh. Relocating the dissimilar circuit elements can include locating the dissimilar circuit elements at a nearest available location outside the perimeter of the local mesh. Other techniques can be used to locate the dissimilar circuit elements to optimize, e.g., optimize for timing and/or routability, the dissimilar circuit element location.

At operation 370 the clock architecture is analyzed. The clock architecture can be analyzed using the MCG cells and the local circuit elements. Analysis of the clock architecture can be performed according to various techniques such as executing clock loading annotation after the routing phase and/or running a Simulation Program with Integrated Circuit Emphasis (SPICE) circuit-level simulation. Analyzing the clock architecture can provide a measurement of the quality of the clock architecture. Based on the clock architecture analysis, the clock architecture may be altered at operation 380. Altering the clock architecture can include altering the local mesh so that the local mesh includes a greater or lesser number of elements or contains a different number of MCG cells placed at different locations. After the clock architecture is altered, the process 300 may end at block 390.

Figure 4:
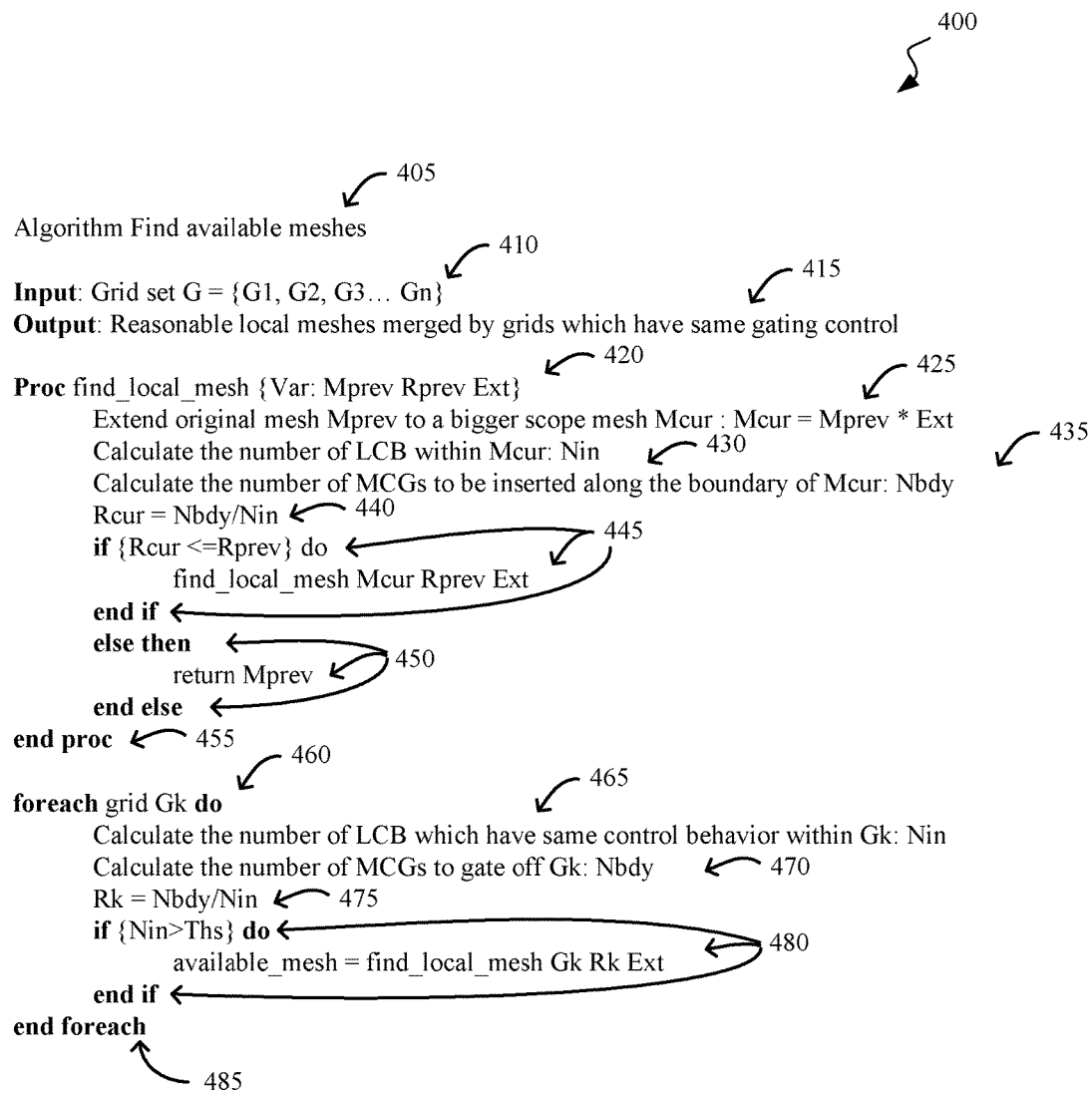
FIG. 4 depicts pseudo-code detailing a sample algorithm for searching for portions of a local mesh for MCG cell placement, according to embodiments consistent with the figures.

FIG. 4 depicts pseudo-code 400 detailing an example algorithm for searching for portions of a local mesh for MCG placement. This is a sample embodiment for purposes of illustration; many other similar embodiments of code logic consistent with this disclosure are possible. Within the pseudo-code 400, "G" refers to a set of grids defined by mesh topology, "Ext" refers to an extension search factor defined by a user, and "Ths" refers to a threshold number, as defined by a user, of LCBs within a grid or mesh.

Line 405 includes the title of the algorithm: "Find available meshes." Line 410 specifies the input, where the input is a set of grids, for example, mesh subsections or quadrants. Line 415 describes the desired output, where the desired output here includes a local mesh with circuit elements with substantially similar clock gating characteristics.

Line 420 includes the call of a process for finding such a local mesh. Line 420 also includes a variable of a search factor and a ratio threshold. Line 425 selects a mesh section consistent with the search factor variable. Line 430 calculates the number of LCBs within the selected mesh section. Line 435 calculates how many MCGs would be required to create a local mesh that surrounds the LCBs. Line 440 determines a possible ratio of MCGs to LCBs for this mesh section. An "if" branch statement 445 includes conditional logic that either selects the mesh section as a possible local mesh or rejects the mesh section with accompanying else logic 450. Line 455 ends the process.

Line 460 begins a procedure that is called during the selection of each mesh section identified as a possible local mesh. Line 465 calculates the number of LCBs of the possible local mesh that have substantially similar clock gating characteristics. Line 470 again calculates how many MCGs that would be required to create a local mesh that surrounds the LCBs. Line 475 determines a possible ratio of MCGs to substantially similar LCBs for the possible mesh section. An "if" branch statement 480 includes conditional logic that selects the mesh section as an identified local mesh if the mesh section has a ratio of substantially similar LCBs to MCGs that satisfies a user-defined threshold. Line 485 ends the called procedure.

Figure 5:
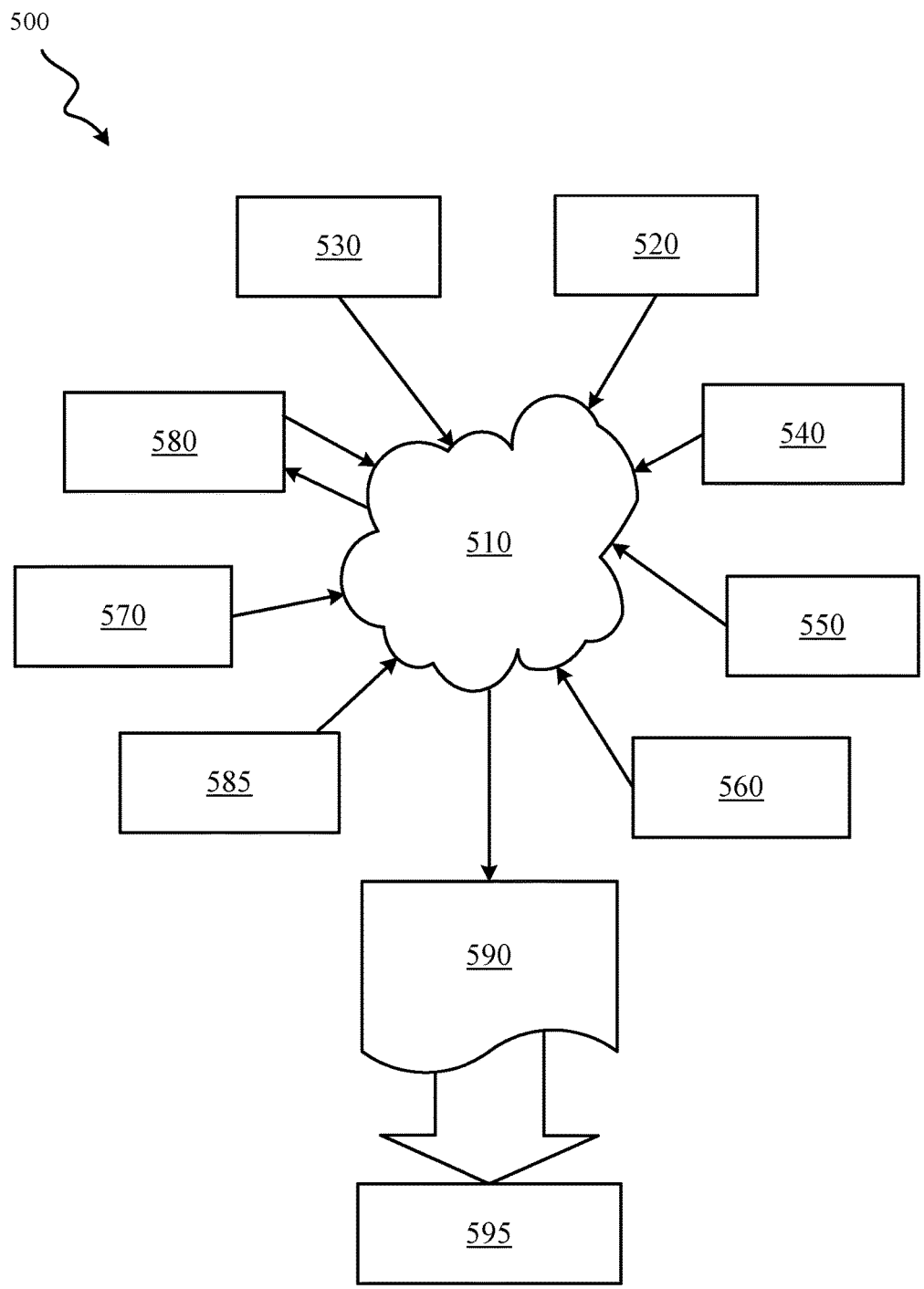
FIG. 5 is a diagram depicting a design process used in semiconductor design, manufacture, and/or test of gated clock mesh circuit depicted in FIG. 2B, FIG. 3 and FIG. 4, according to embodiments of the disclosure.

FIG. 5 is a diagram depicting a design process used in semiconductor design, manufacture, and/or test of the gated clock mesh circuit depicted in FIG. 2B, FIG. 3 and FIG. 4, according to embodiments of the disclosure.

FIG. 5 illustrates multiple design structures 500 including an input design structure 520 that is preferably processed by a design process. Design structure 520 may be a logical simulation design structure generated and processed by design process 510 to produce a logically equivalent functional representation of a hardware device. Design structure 520 may alternatively include data or program instructions that, when processed by design process 510, generate a functional representation of the physical structure of a hardware device. Whether representing functional or structural design features, design structure 520 may be generated using electronic computer-aided design, such as that implemented by a core developer/designer. When encoded on a machine-readable data transmission, gate array, or storage medium, design structure 520 may be accessed and processed by at least one hardware or software modules within design process 510 to simulate or otherwise functionally represent an electronic component, circuit, electronic or logic module, apparatus, device, or system such as those shown in FIG. 2A and FIG. 2B, or a circuit personalized or modified by the methods described in reference to FIG. 3 and FIG. 4. As such, design structure 520 may include files or other data structures including human or machine-readable source code, compiled structures, and computer-executable code structures that, when processed by a design or simulation data processing system, functionally simulate or otherwise represent circuits or other levels of hardware logic design. Such data structures may include hardware-description language design entities or other data structures conforming to or compatible with lower-level HDL design languages such as Verilog and VHDL, or higher level design languages such as C or C++.

Design process 510 preferably employs and incorporates hardware or software modules for synthesizing, translating, or otherwise processing a design/simulation functional equivalent of the components, circuits, devices, or logic structures shown in FIG. 2A and FIG. 2B, or a circuit personalized or modified by the methods described in reference to FIG. 3 and FIG. 4, to generate a Netlist 580 which may contain design structures such as design structure 520. Netlist 580 may comprise, for example, compiled or otherwise processed data structures representing a list of wires, discrete components, logic gates, control circuits, I/O devices, models, etc. that describe the connections to other elements and circuits in an integrated circuit design. Netlist 580 may be synthesized using an iterative process in which Netlist 580 is resynthesized at least one times depending on design specifications and parameters for the device. As with other design structure types described herein, Netlist 580 may be recorded on a machine-readable data storage medium or programmed into a programmable gate array. The storage medium may be a non-volatile storage medium such as a magnetic or optical disk drive, a programmable gate array, a compact flash, or other flash memory. Additionally, the medium may be a system or cache memory, buffer space, or electrically or optically conductive devices and materials on which data packets may be transmitted and intermediately stored through the internet, or other suitable networking means. As used herein, a storage medium upon which a design structure, e.g., 500, 520, or 590, is stored is not to be construed as a transitory signal per se.

Design process 510 may include hardware and software modules for processing a variety of input data structure types including Netlist 580. Such data structure types may reside, for example, within library elements 530 and include a set of commonly used elements, circuits, and devices, including models, layouts, and symbolic representations, for a given manufacturing technology, e.g., different technology nodes, 32 nm, 45 nm, 90 nm, etc. The data structure types may further include design specifications 540, characterization data 550, verification data 560, design rules 570, and test data files 585 which may include input test patterns, output test results, and other testing information. Design process 510 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 510, without deviating from the scope and spirit of the disclosure. Design process 510 may also include modules for performing standard circuit design processes such as timing analysis, verification, design rule checking, place and route operations, etc.

Design process 510 employs and incorporates logic and physical design tools such as HDL compilers and simulation model build tools to process design structure 520 together with some or all of the depicted supporting data structures, along with any additional mechanical design or data, to generate a second design structure 590. Design structure 590 resides on a storage medium or programmable gate array in a data format used for the exchange of data of mechanical devices and structures (e.g., information stored on an IGES, DXF, Parasolid XT, JT, DRG, or any other suitable format for storing or rendering such mechanical design structures). Similar to design structure 520, design structure 590 preferably comprises at least one files, data structures, or other computer-encoded data or instructions that reside on transmission or data storage media and that, when processed by an ECAD system, generate a logically or otherwise functionally equivalent form of at least one of the embodiments of the disclosure shown in FIG. 2A and FIG. 2B, or a circuit personalized or modified by the methods described in reference to FIG. 3 and FIG. 4. In one embodiment, design structure 590 may comprise a compiled, executable HDL simulation model that functionally simulates the devices shown in FIG. 2A and FIG. 2B, or a circuit personalized or modified by the methods described in reference to FIG. 3 and FIG. 4.

Design structure 590 may also employ a data format used for the exchange of layout data of integrated circuits and/or symbolic data format (e.g., information stored in a GDSII, GL1, OASIS, map files, or any other suitable format for storing such design data structures). Design structure 590 may comprise information such as symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 2A and FIG. 2B, or a circuit personalized or modified by the methods described in reference to FIG. 3 and FIG. 4. Design structure 590 may then proceed to a state 595 where, for example, design structure 590 proceeds to tape-out, is released to manufacturing, is released to a mask house, is sent to another design house, is sent back to the customer, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The functionality outlined in the discussions herein regarding FIG. 1, FIG. 2A, FIG. 2B, and FIG. 3 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flow diagram illustrations and/or block diagrams of methods, apparatus (systems), and computer program products according to embodiments of the invention. It will be understood that each block/operation of the flow diagram illustrations and/or block diagrams, and combinations of blocks/operations in the flow diagram illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow diagram and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow diagram and/or block diagram block or blocks.

The flow diagram and block diagrams in the Figures illustrate the architecture, functionality, and operation of possible implementations of systems, methods, and computer program products according to various embodiments of the present invention. In this regard, each block in the flow diagram or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, implemented on at least one processor circuit, of designing a clock mesh of an integrated circuit (IC), the method comprising:
retrieving, from at least one IC design file by using a clock gating manager program running on at least one processor circuit, data that includes locations of circuit elements electrically connected to the clock mesh, the data further including clock gating characteristics of the circuit elements;
identifying, by analyzing the data with the clock gating manager program, a local mesh that is a portion of the clock mesh, the local mesh electrically connected to a first subset of the circuit elements, the first subset of circuit elements satisfying a first density threshold; and.
electrically interconnecting, with the clock gating manager program and within the at least one IC design file, outputs of a set of mesh clock gating (MCG) cells to local mesh wires located at the perimeter of the local mesh, the MCG cells configured to enable and disable a clock signal driven by the MCG cells, through the local mesh wires, to circuit elements, of the first subset of circuit elements, having substantially similar clock gating characteristics.

2. The method of claim 1, wherein each circuit element of the circuit elements electrically connected to the clock mesh is selected from the group consisting of: a latch, a flip-flop, a register, a memory cell, a local clock buffer (LCB) and an MCG cell.

3. The method of claim 1, wherein the clock gating characteristics include the timing of a clock gating signal used to enable and disable clock signals driven to the first subset of circuit elements.

4. The method of claim 1, further comprising replacing, with ungated clock buffers, local clock buffers (LCBs) included within the first subset of circuit elements.

5. The method of claim 1, further comprising relocating, prior to electrically interconnecting outputs of the set of MCG cells, from within the local mesh to the clock mesh outside of the local mesh, a circuit element of the first subset of the circuit elements, the circuit element having clock gating characteristics dissimilar to the substantially similar clock gating characteristics.

6. The method of claim 1, wherein identifying a local mesh that is a portion of the clock mesh further comprises:
identifying, from the circuit elements, a second subset of circuit elements that satisfies a second density threshold;
determining that the second subset of circuit elements has substantially similar clock gating characteristics; and
determining that the second subset of circuit elements satisfy the first density threshold.

7. The method of claim 1, wherein the first density threshold is selected from the group consisting of: a ratio of a number MCG cells to a number of circuit elements, a ratio of the number circuit elements to a number of wires within the local mesh, and a ratio of the number of circuit elements to a placement area within the local mesh.

8. The method of claim 6, wherein the second density threshold is selected from the group consisting of: a ratio of a number MCG cells to a number of circuit elements, a ratio of a number circuit elements to a number of wires within the local mesh, and a ratio of a number of circuit elements to an area within the local mesh.

9. The method of claim 1, wherein the data includes clock optimization data.

10. The method of claim 9, further comprising formatting the clock optimization data into a mesh topology data format.

11. The method of claim 1, wherein each circuit element of the first subset of the circuit elements has schematically identical clock gating characteristics.

12. The method of claim 1, further comprising:
performing a functional simulation of a clock distribution circuit, the clock distribution circuit including at least the local mesh, the first set of circuit elements, and the set of MCG cells;
analyzing results of the simulation; and
reconfiguring, in response to the results of the simulation, the clock distribution circuit by performing at least one of:
resizing the local mesh;
repositioning at least one circuit element of the first set of circuit elements; and
repositioning at least one MCG cell of the set of MCG cells.

13. An integrated circuit (IC) comprising:
a clock mesh, configured to distribute a clock signal to a set of circuit elements;
a local mesh that is a portion of the clock mesh, the local mesh electrically coupled to clock inputs of a first subset of the set of circuit elements, the first subset having substantially similar clock gating characteristics and satisfying a first density threshold; and
a set of mesh clock gating (MCG) cells surrounding the local mesh, the set of MCG cells having inputs electrically coupled to the clock mesh and having outputs electrically connected to the local mesh, the set of MCG cells configured to enable and disable distribution of the clock signal, through wires of the local mesh, to the first subset of circuit elements.

14. The IC of claim 13, wherein each circuit element of the set of circuit elements is selected from the group consisting of: a latch, a flip-flop, a register, a memory cell, a local clock buffer (LCB) and an MCG cell.

15. The IC of claim 14, wherein the set of circuit elements includes an LCB reconfigured to function as an ungated clock buffer.

16. The IC of claim 13, further comprising a set of clock buffers, wherein each clock buffer of the set of clock buffers has schematically identical clock gating characteristics.

17. The IC of claim 13 wherein the IC is a complementary metal-oxide semiconductor (CMOS) IC.

18. A design structure tangibly embodied in a non-transitory machine-readable storage medium used in a design process of a clock mesh of an integrated circuit (IC), the design structure having elements that, when processed in a semiconductor manufacturing facility, produce the IC, the IC comprising:
the clock mesh, configured to distribute a clock signal to a set of circuit elements;
a local mesh that is a portion of the clock mesh, the local mesh electrically coupled to clock inputs of a first subset of the set of circuit elements, the first subset having substantially similar clock gating characteristics and satisfying a first density threshold; and
a set of mesh clock gating (MCG) cells surrounding the local mesh, the set of MCG cells having inputs electrically coupled to the clock mesh and having outputs electrically connected to the local mesh, the set of MCG cells configured to enable and disable distribution of the clock signal, through wires of the local mesh, to the first subset of circuit elements.

19. The design structure of claim 18, wherein each circuit element of the set of circuit elements is selected from the group consisting of: a latch, a flip-flop, a register, a memory cell, a local clock buffer (LCB) and an MCG cell.

20. The design structure of claim 18, wherein the first density threshold is selected from the group consisting of: a ratio of a number MCG cells to a number of circuit elements, a ratio of a number circuit elements to a number of wires within the local mesh, and a ratio of a number of circuit elements to an area within the local mesh.

* * * * *